Feb. 9, 1971  F. A. KRUSEMARK  3,561,215

DUAL RATIO MASTER CYLINDER

Filed June 27, 1969

INVENTOR
FREDERICK A. KRUSEMARK

BY Robert L. Zieg
ATTORNEY

United States Patent Office 3,561,215
Patented Feb. 9, 1971

3,561,215
DUAL RATIO MASTER CYLINDER
Frederick A. Krusemark, Maywood, Ill., assignor to Borg-Warner Corporation, Chicago, Ill., a corporation of Delaware
Filed June 27, 1969, Ser. No. 837,080
Int. Cl. F15b 7/08
U.S. Cl. 60—54.6                                    8 Claims

ABSTRACT OF THE DISCLOSURE

A dual ratio master cylinder adapted to be connected to a hydraulic braking system, the master cylinder including a pair of pistons of different diameter laterally displaced from one another and means disposed between the pistons adapted to exert a force to resist a compressive force up to a predetermined value such that upon activation of the master cylinder, all "play" in the system is removed in a low pressure high volume operation until a predetermined pressure is built up within the system at which time a secondary hydraulic booster acts to build up additional pressure in a higher pressure lower volume phase of operation.

SUMMARY OF THE INVENTION

This invention relates to hydraulic master cylinders and more particularly, to hydraulic master cylinders of the dual ratio type.

Dual ratio master cylinders have been known in the brake art for some time. The main purpose for such a device is to bridge the gap presently existing in the market between brake systems of the power assist type and manual braking systems with no assist. The aim of such systems is to provide a brake master cylinder that will require less pedal effort with the same foot travel as existing manual master cylinders and to supply lower pedal effort to power assisted systems when the power assist is inoperative.

The optimum design for any braking system is to generate the maximum line pressure while utilizing the minimum pedal force and the smallest pedal travel. In manual systems presently in existence, any efforts to decrease pedal effort to generate the same line pressure result in an increase in pedal travel and any efforts tending to decrease pedal travel result in an increase in the pedal force which must be applied.

The purpose of a dual ratio master cylinder is to generate line pressure in two stages. Stage one utilizes movement of a large area piston to displace a large volume of fluid at low pressure with minimum pedal travel. This stage will function to take up all slack in the system, and set the brake shoes against the drums in drum brake systems or the pads against the discs in a disc brake system and build up line pressure to a predetermined value.

At this point, termed the transition point, the second stage will become operative utilizing a smaller area piston to displace a smaller volume of fluid to build up additional pressure and apply the brakes.

Previous designs of this type have included serious shortcomings which caused the automotive industry to reject them except for industrial applications where they are presently in use. Certain of these shortcomings included:

(1) The transition point could be detected at the brake pedal resulting in an unsatisfactory feel to the operator's foot.

(2) The unit switched to the second stage at a geometrically predetermined point which caused brake application during the first stage when brakes were adjusted tight, or excessive pedal travel when brakes were loose.

(3) Many of the units had no fail safe switch-back feature whereby the device could return from second stage application to first stage application if either the brake system or master cylinder developed a leak under pressure.

Due to these shortcomings, efforts to introduce this type of unit to wide use have, so far, been fruitless.

The present invention is directed to providing a dual ratio master cylinder utilizing a high ratio in the master cylinder for initial pressure generation to remove play in the system and to set the brake shoes against the drums. The second stage of operation employs a hydraulic booster of lower ratio which builds up additional pressure. The present invention further provides a fail-safe backup device which will cause the master cylinder to revert to the high ratio stage to deliver pressure to the hydraulic brake system, if the secondary system becomes inoperative after a certain degree of travel.

DESCRIPTION OF THE PREFERRED EMBODIMENT

Figure 1:
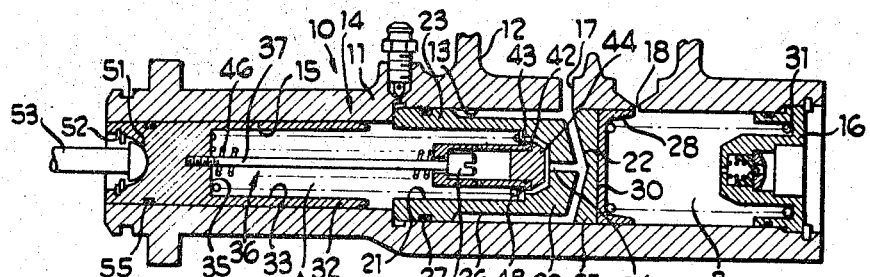
FIG. 1 is a sectional view showing an embodiment of the invention with the movable parts of the structure positioned normally before operation of the brakes.

As best illustrated in FIG. 1, a dual ratio master cylinder 10 is shown including a housing generally identified as 11. A fluid reservoir 12 is shown defined by the housing 11. Also defined by the housing 11 is a stepped bore 14. The bore 14 includes a relatively large diameter portion 13 and a relatively small diameter portion 15. In one end of the bore 14 is a fluid outlet 16 here shown as a conventional residual pressure valve is adapted to be connected to a hydraulic braking system (not shown). A fluid conduit 17 and a port 18 connect the fluid reservoir 12 to portion 13 of the bore 14.

A hollow piston 20 is shown slidably disposed in the large diameter portion 13 of bore 14 and is adapted to slide axially along said portion. The piston 20 is operative to divide the bore 14 of housing 11 into a low pressure chamber A and a high pressure chamber B which will be more fully described later. The piston 20 defines an internal bore 21. A fluid conduit 22 is shown defined by the piston 20 and includes an inlet port 24. The piston 20 includes a pair of land sections 23 and 25, and a peripheral relief 26. A seal 27 is shown disposed intermediate the land section 23 and portion 13 of the bore 14. A lip seal 28 is shown connected to an end face 30 of the piston 20. A resilient member, here shown as a coil spring 31, is disposed between the lip seal 28 and the fluid outlet 16 and is adapted to urge the piston 20 to the left as shown in FIG. 1.

A piston 32 is shown disposed in the small diameter portion 15 of bore 14, the piston having an outer diameter smaller than the outer diameter of the piston 20, but larger than the inner diameter of the bore 21. The piston 32 defines an inner bore 33 having an end wall 35.

The high pressure chamber previously referred to will now be defined as the variable volume which exists in section 13 between the lip seal 28 after it has closed off port 18 and the fluid outlet 16. The low pressure chamber A will be defined as the variable volume existing in the bore 14 between end wall 35 of piston 32 and the inlet port 24 of conduit 22.

A mechanical linkage 36 is connected between the piston 32 and the piston 20 to urge them to a predetermined relative axial displacement. The mechanical linkage 36 includes an axially extending rod 37 which is connected to the piston 32. On one end of the rod 37 is an enlarged head 38. A sleeve 40 is shown defining a hollow cavity 41. The sleeve 40 includes an annular upturned shoulder 42. An apertured washer 43 is connected to the piston 20 and serves to limit the movement of the sleeve 40 to the left by its contact with the shoulder 42. The apertured washer 43 permits flow between the reservoir 12 and the chamber A. Inserted in one end of the cavity 41 is a valve member 44 which is adapted to seat against inlet port 24. The sleeve 40 defines an opening 45 in the other end through which the connecting rod 37 extends. A resilient member 46, here shown as a coil spring, is positioned between the piston 32 and the sleeve 40 to urge them apart.

Means 48 are provided disposed between the piston 20 and the piston 32 which are adapted to resist any compressive force urging the pistons together. This means 48 is further adapted to maintain a predetermined distance between the pistons up to a predetermined value of said compressive force, the means being yieldable above the predetermined value to allow relative movement between the pistons, the separating force remaining substantially constant. The means 48 is shown here as a preloaded conventional compression coil spring. It should be realized, however, that any of a number of other means functioning in the same manner could replace the compression spring 48 without substantially altering the principles of the present invention.

The piston 32 defines a concave surface 51 in one end thereof which is adapted to receive push rod 53 which is connected to a brake linkage assembly not shown. The push rod 53 is held in position by a snap ring 52. A seal 55 is disposed in the outer periphery of the piston 32 between the piston 32 and the bore 14.

The operation of the embodiment shown in FIGS. 1 through 4 is as follows. When energization of the hydraulic brake system is desired, force is applied to the brake pedal (not shown) which, through the brake linkage, transmits the force to the push rod 53. The push rod 53 moves to the right as shown in FIG. 1 urging piston 32 to the right also. At this point, there is relatively little pressure in the brake lines to act against the lip seal 28. The compression spring 48 acts to maintain the predetermined axial distance between pistons 20 and 32. The mechanical linkage 36 urges the pistons 20 and 32 to a predetermined relative axial displacement.

Figure 2:
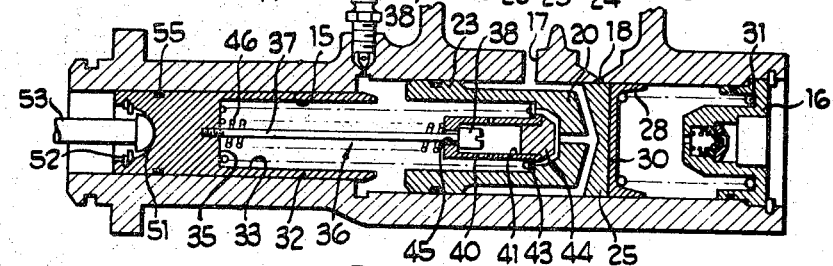
FIG. 2 is a sectional view showing the parts related after initial operation of the brake pedal in the low pressure high volume stage.

Any slight movement of piston 20 to the right as shown in FIG. 2 will cause the lip seal 28 to pass over the port 18 thereby isolating the pressure chamber B and the rest of the hydraulic brake system from the fluid reservoir 12. As a result of such isolation, pressure is now built up in the brake lines and the brake shoes expand to contact the respective brake drums.

As the push rod 53 is forced further to the right, as shown in FIG. 2, and correspondingly the pistons move further to the right, all play in the system is removed at a high ratio due to the relatively large area of the piston 20 and, correspondingly, a relatively large volume of fluid is displaced due to movement of the piston 20. When the play is removed as the piston 20 moves further to the right, the pressure in the system increases.

At this point, it should be obvious that a compressive force is exerted on the resilient means 48 tending to collapse such resilient means and to allow for relative movement between the pistons 20 and 32, to bring them closer together. The compressive force is due to a combination of forces neglecting the effects of friction. One such force acts to the left against lip seal 28 and is generated by the pressure built up in the hydraulic brake system acting against the area of the end face 30 of the piston 20. The other force contributing to the compression of the resilient means 48 is the force applied by the push rod 53 to the piston 32 at its left end. The resilient means 48 will allow no relative movement between the pistons until the compressive force is sufficient to overcome the design preload force of the spring member 48.

Since no relative movement between the pistons had taken place, the valve member 44 remains off conduit 22 allowing communication between the fluid reservoir 12 and the inner bore 21 of piston 20 through the apertured washer 43. As the piston 20 moves to the right as shown in FIG. 2, a vacuum is created behind the piston in the section 13. Hydraulic fluid is caused to flow from the fluid reservoir 12 through the conduit 17, through peripheral relief 26, through conduit 22, inlet port 24 and through apertured washer 43 to fill this expanding volume.

As soon as the pressure in the hydraulic braking system has reached a predetermined point, sufficient such that the pressure times the area of end face 30 of piston 20 produces a force which in combination with the force exerted by push rod 53 will overcome the pre-load force inherent in resilient means 48, the spring force will be overcome thus allowing relative movement between pistons 20 and 32. Still, resilient means 48 will exert a separating force on pistons 20 and 32 which is substantially constant.

For a short interval, piston 20 will remain stationary while piston 32 moves toward it. The mechanical linkage 36 urges the sleeve 40 and the valve member 44 to the right such that the valve member 44 will seat upon inlet port 24 of conduit 22, thereby blocking any fluid flow between the fluid reservoir 12 and the low-pressure chamber. The fluid contained in the low-pressure chamber comprised of inner bore 21, inner bore 33 and the area behind the piston member 20 in section 13 is now trapped.

Figure 3:
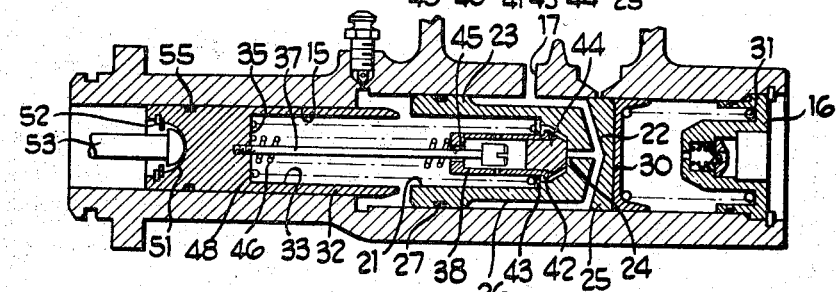
FIG. 3 is a sectional view showing the parts related in the high pressure low volume stage.

At this point, the operation of the master cylinder is now in the second stage as best shown in FIG. 3. Since the fluid is trapped, any movement of piston 32 toward piston 20 will result in a proportional movement of the piston 20 since the trapped fluid is substantially non-compressible. Due to the difference in areas between piston 20 and piston 32, and accordingly, the difference in volumes displaced by movements of the pistons, movement of the piston 32 for any given distance will result in movement of the piston 20 through a lesser distance. The distances moved by the pistons are reciprocal the areas of the pistons. For instance, if the area of piston 20 is three times the area of piston 32, any movement of piston 32 for three-tenths of an inch, will result in a corresponding movement of piston 20 of one-tenth of an inch. Movement of the piston 20 creates additional pressure in the hydraulic brake system in addition to pressure reached in first stage and acts to apply the brakes.

Figure 4:
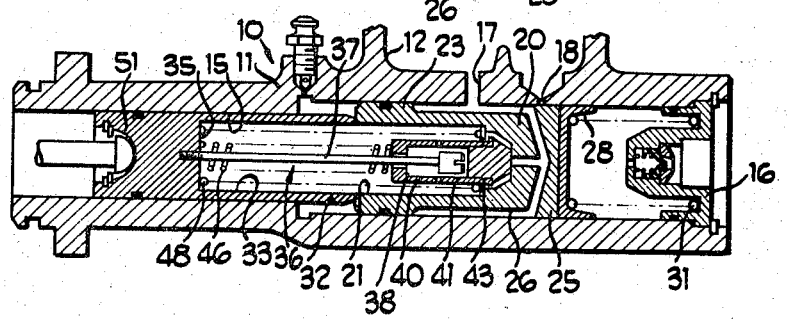
FIG. 4 is a sectional view showing the parts reverting back to the initial stage of operation.

If any leak under pressure would develop in prior art devices in the hydraulic brake system which would require displacement of a large volume of fluid to apply the brakes, such pressure would be generated in the high pressure low volume stage requiring excessive pedal travel. To preclude such results, a safety feature is incorporated in the operation of the present invention as best shown in FIG. 4 which will establish a mechanical connection between the pistons 20 and 32 after a predetermined amount of relative movement therebetween. The outer diameter of piston 32 is greater than the inner diameter of the bore 21 defined in piston 20. After a given movement between the pistons, the outer diameter of piston member 32 will come into abutting relationship with the piston member 20 and in effect, the unit will operate as a solid assembly thereby switching back to the first stage of operation wherein any motion of the push rod 53 will result in a corresponding motion of the piston 20 which, in effect, is the same as the operation in the first stage.

When pressure is released on the brake pedal, the force of the resilient means 48 positioned between the pistons 20 and 32 will act to move the pistons axially away from each other. The spring 31 will act to return piston 20 to the left. As the pistons 20 and 32 move relatively away from each other, the piston 38 engages one end of the sleeve 40 and moves to the left which will act to move the valve member 44 off the conduit 22 thereby reestablishing contact between the fluid reservoir 12 and the inner bore 21.

Figure 5:
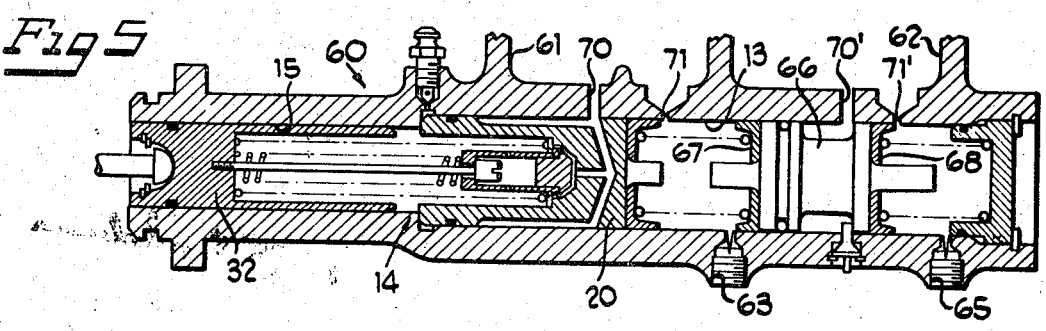
FIG. 5 is a sectional view of a tandem master cylinder incorporating the features of the present invention.

FIG. 5 shows a tandem master cylinder 60 incorporating the features of the present invention. The operation of this device is for all practical purposes, identical to the operation of the device shown and described in FIGS. 1 through 4. Structurally, the only main difference is the incorporation of two fluid reservoirs 61 and 62 separated one from another and defined in the housing 11 of the master cylinder 60. A pair of fluid outlets 63 and 65 are shown in communication with the bore 13. Each outlet is adapted to be connected to a hydraulic line leading to a pair of wheel brakes. An additional piston member 66 is shown slidably disposed within the bore 13 and the piston member includes a pair of lip seals 67 and 68, each being attached to an end of the piston 66. Conduits 70 and 70' and ports 71 and 71' are shown connecting each of the respective fluid reservoirs 61 and 62 to the bore 13.

Various of the features of the invention have been particularly shown and described, however, it should be obvious to one skilled in the art that various modifications may be made therein without departing from the scope of the invention.

What is claimed is:

1. A pressure cylinder for hydraulic brakes including a housing; a bore defined by said housing, said bore including a relatively large diameter portion and a relatively small diameter portion; a fluid reservoir in communication with said bore; a fluid outlet in communication with said bore adapted to be connected to a hydraulic braking system; a pair of laterally spaced apart pistons, one of said pistons slidable within said relatively large diameter portion of said bore, the other of said pistons slidable within said relatively small diameter portion of said bore; means disposed between said pistons adapted to exert a force to resist a compressive force urging said pistons together and to maintain a predetermined distance between said pistons up to a predetermined value of said compressive force, said means being yieldable above said predetermined value to allow relative movement of said pistons toward one another, said force resisting said compressive force remaining substantially constant.

2. A pressure cylinder as in claim 1 wherein said piston slidable within said relatively large diameter portion of said bore defines an inner bore of fixed diameter and the other of said pistons including an outer diameter of a greater dimension than the diameter of said inner bore of said other piston.

3. A pressure cylinder for hydraulic brakes including a housing; a bore defined by said housing; a fluid reservoir in communication with said bore; a fluid outlet in communication with said bore adapted to be connected to a hydraulic braking system; a pair of pistons operable within said bore, one of said pistons defining an inner bore of fixed diameter and the other of said pistons having an outer diameter greater than the diameter of said inner bore defined by said first piston; means disposed between said pistons adapted to exert a force to resist a compressive force urging said pistons together and to maintain a predetermined axial distance between said pistons up to a predetermined value of said compressive force, said means being yieldable above said predetermined value to allow relative movement between said pistons up to a predetermined point, said force resisting said compressive force remaining substantially constant.

4. A pressure cylinder as in claim 3 whereby upon predetermined relative movement of said pistons toward each other a mechanical relationship is established between said pistons.

5. A pressure cylinder as in claim 3 in which said bore includes a relatively large diameter portion and a relatively small diameter portion.

6. A pressure cylinder as in claim 5 whereby said pistons are laterally spaced apart one from the other and one of said pistons is slidable within said relatively large diameter portion of said bore and the other of said pistons is slidable within said relatively small diameter portion of said bore.

7. A pressure cylinder for hydraulic brakes including a housing; a bore defined by said housing, said bore including a relatively large diameter portion and a relatively small diameter portion; a fluid reservoir in communication with said bore; a fluid outlet in communication with said bore adapted to be connected to a hydraulic braking system; a pair of laterally spaced apart pistons, one of said pistons slidable within said relatively large diameter portion of said bore, said piston defining an inner bore of fixed diameter, the other of said pistons slidable within said relatively small diameter portion of said bore and having an outer diameter greater than the diameter of said inner bore defined by said other piston; a fluid chamber defined by said pistons and said bore; a fluid circuit adapted to communicate fluid between said fluid reservoir and said fluid chamber; means disposed between said pistons adapted to exert a force to resist a compressive force urging said pistons together and to maintain a predetermined axial distance between said pistons up to a predetermined value of said compressive force, said means being yieldable above said predetermined value to allow relative movement between said pistons, said force resisting said compressive force remaining substantially constant.

8. A pressure cylinder as in claim 7 including valve means associated with one of said pistons operative upon yielding of said means between said pistons to close said fluid circuit between said reservoir and said fluid chamber.

References Cited

UNITED STATES PATENTS

| | | | |
|---|---|---|---|
| 1,958,722 | 5/1934 | Sinclair et al. | 60—54.6A |
| 2,060,692 | 11/1936 | Rockwell | 60—54.6AX |
| 2,179,241 | 11/1939 | Groves | 60—54.6A |
| 2,313,273 | 3/1943 | Schnell | 60—54.6A |
| 2,313,274 | 3/1943 | Schnell | 60—54.6A |
| 2,343,900 | 3/1944 | Groves | 60—54.6A |
| 2,343,901 | 3/1944 | Groves | 60—54.6A |
| 2,407,957 | 9/1946 | Hull-Ryde | 60—54.6A |
| 2,820,347 | 1/1958 | Highland et al. | 60—54.6A |
| 2,886,950 | 5/1959 | Hause | 60—54.6P |
| 3,191,384 | 6/1965 | Krusemark | 60—54.6A |

MARTIN P. SCHWADRON, Primary Examiner

R. BUNEVICH, Assistant Examiner